United States Patent [19]

Pino

[11] 4,350,199

[45] Sep. 21, 1982

[54] QUICK CLOSING GATE

[76] Inventor: Isidro Pino, Zia Pueblo, San Ysidro, N. Mex. 87053

[21] Appl. No.: 231,651

[22] Filed: Feb. 5, 1981

[51] Int. Cl.³ .................... E05D 15/12; E05D 15/22
[52] U.S. Cl. ................................ 160/201; 160/195; 160/203
[58] Field of Search ............... 160/192, 194, 195, 201, 160/203; 119/82, 11; 49/379

[56] References Cited

U.S. PATENT DOCUMENTS

| | | | |
|---|---|---|---|
| 1,305,838 | 6/1919 | Shur | 160/201 |
| 1,521,956 | 1/1925 | Koziol | 160/201 |
| 1,583,990 | 5/1926 | Mundt et al. | 160/201 |
| 1,820,941 | 9/1931 | Hawks | 160/195 |
| 1,886,490 | 11/1932 | Lynch | 160/203 |
| 2,027,153 | 1/1936 | Cornell | 160/201 |
| 2,218,068 | 10/1940 | Klein | 160/192 |
| 2,257,103 | 9/1941 | Brokering | 160/201 |
| 2,765,032 | 10/1956 | Butzow | 160/201 |

Primary Examiner—Peter M. Caun
Attorney, Agent, or Firm—Robert W. Harris

[57] ABSTRACT

A quick closing gate, formed of uniformly spaced horizontal bars slidably engaged within a gate track of two sections joined at an acute angle close to ninety degrees, said gate track being rotatable so as to be easily rotated from a position in which gravity maintains the gate in a stable open position, to a position in which gravity acts to close the gate. Quick closure of the gate is facilitated by compressed springs in one embodiment of the invention.

9 Claims, 5 Drawing Figures

QUICK CLOSING GATE

BACKGROUND OF THE INVENTION

The invention pertains to quick-closing gates useful particularly in cattle handling operations, which are however also useful in numerous other applications as well.

In cattle shipping operations it is often necessary to move a number of cattle into a confined space, as for example into a cattle hauling truck or a railroad cattle car. As soon as the cattle have been herded into the truck or railroad cattle car it is necessary to close a gate to prevent egress of the cattle.

Since the cattle will naturally tend to be frightened by the operation of being herded into a closely confined space, and will quickly seize any opportunity to escape from such confinement, it is important that the operator be able to quickly close a secure gate, as soon as the cattle have been gathered into the desired confinement area. Otherwise there is a danger that a sudden outward movement of the cattle may result in serious injury to the operator, as well as escape of cattle.

Various types of gates or partitions for confinement of cattle are disclosed in the following United States patents known to applicant: Canda (U.S. Pat. No. 449,203; hereinafter "Canda '203"), Canda (U.S. Pat. No. 345,481; hereinafter "Canda '481"), and Hicks (U.S. Pat. No. 281,067). Also known to applicant is the patent of Fimbel (U.S. Pat. No. 2,966,212), which discloses wide vertically moving sectioned doors, and is not directly pertinent to consideration of applicant's invention, being mentioned only as indicating a background level of skill in the general art of movable gates and doors.

Canda '203 discloses gates for cattle cars, formed of linked bars or strips which move in ways (p. 1, lines 44-69). These gates have a chain and pulley mechanism (p. 1 line 70-p. 2, line 28) which functions to move the gates.

Canda '481 discloses gates for cattle cars, virtually identical to those disclosed in Canda '203, also using a chain and pulley mechanism to move the gates (p. 1, line 69-p. 2, line 18).

Hicks discloses movable partitions for cattle cars, comprised of bars moving in guide ways, which also are moved by a chain and pulley mechanism on either side of the car (p. 1 lines 21-69).

The Canda '203 patent teaches that the use of such chain and pulley mechanisms as disclosed in Canda '203, Canda '481 and Hicks, is conducive to fairly slow operation of such gates. The Canda '203 specification states that by the operation of the chain and pulley mechanism, "the gates may be prevented from sliding down with a rush when being lowered to divide the car into stalls or compartments" (p. 1, lines 70-74; emphasis added).

The Canda and Hicks patents do not disclose gates having a beneficial feature of applicant's gates, discussed below, namely gates in which the upper and lower portions of the tracks form an acute angle. Canda '203 discloses gates in which the upper portions of the tracks are inclined at an obtuse angle to the lower tracks (FIG. 2; p. 1 lines 60-69). Nor do these patents disclose gates in which the entire track assembly rotates about a pivot axis as in applicant's gate, allowing the upper track to easily and quickly move from a position in which gravity keeps the gate open, to a position in which gravity tends to close the gate.

Thus the patents discussed above disclose gates having a feature, avoided by applicant, conducive to slow operation of such gates, and lacking a feature of applicant's gates, conducive to quick closure of his gates.

SUMMARY OF THE INVENTION

The present invention is a quick closing gate particularly useful in cattle handling operations. The gate is formed of horizontal bars, flexibly linked by spacers which maintain uniform spacing of the bars. The ends of the bars roll or slide in a gate track having an essentially vertical lower gate track which joins an essentially horizontal upper gate track. The lower gate and track and upper gate track form an acute angle reasonably close to 90 degrees.

The gate track is so mounted as to be pivotally movable about a pivot axis near the junction of the lower gate track and the upper gate track.

When the gate is in the open position, the lower gate track is vertical, and the bars rest with their ends in the upper gate track. Because the upper gate track is inclined at an acute angle to the vertical lower gate track, sloping downward away from the junction with the lower gate track, gravitation urges the bars away from the lower gate track, thus maintaining the gate in a stable open position.

When the operator desires to close the gate, an upward movement of the upper gate track causes a pivotal motion of the gate track about the pivot axis, moving the upper gate track across the horizontal direction, to orientations sloping downward toward the junction with the lower gate track, so that the bars slide into the lower gate track, thence falling to close the gate.

In one embodiment of applicant's invention compressed springs further accelerate the downward motion of the closing gate. The springs are located in the end of the upper gate track opposite the junction with the lower gate track, and are compressed by the bars when the gate is opened. The compression is maintained by a lock which secures one of the bars against the force exerted by the compressed springs when the gate is open. When the lock is released the compressed springs move the bars from the upper gate track into the lower gate track, so that the bars fall and close the gate.

DESCRIPTION OF THE PREFERRED EMBODIMENTS

Figure 1:
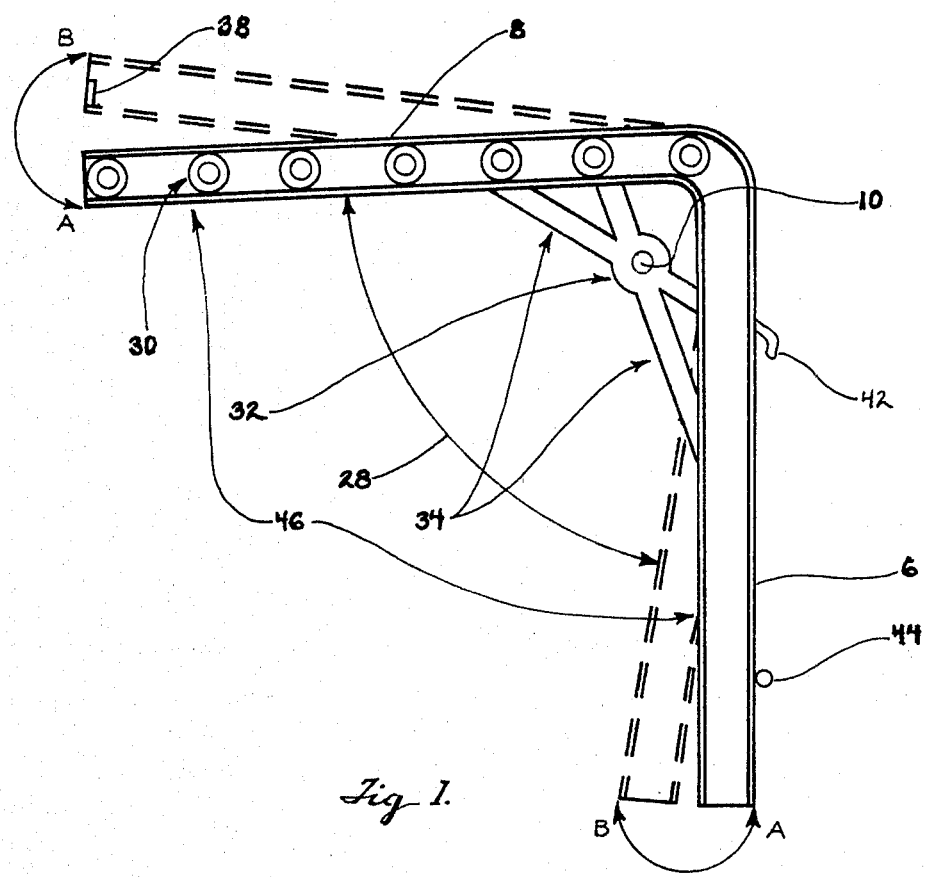
FIG. 1 is a side elevational view of the gate, in the open position (position A), and also indicating the position of the gate when closed (dashed lines, position B).
Figure 2:
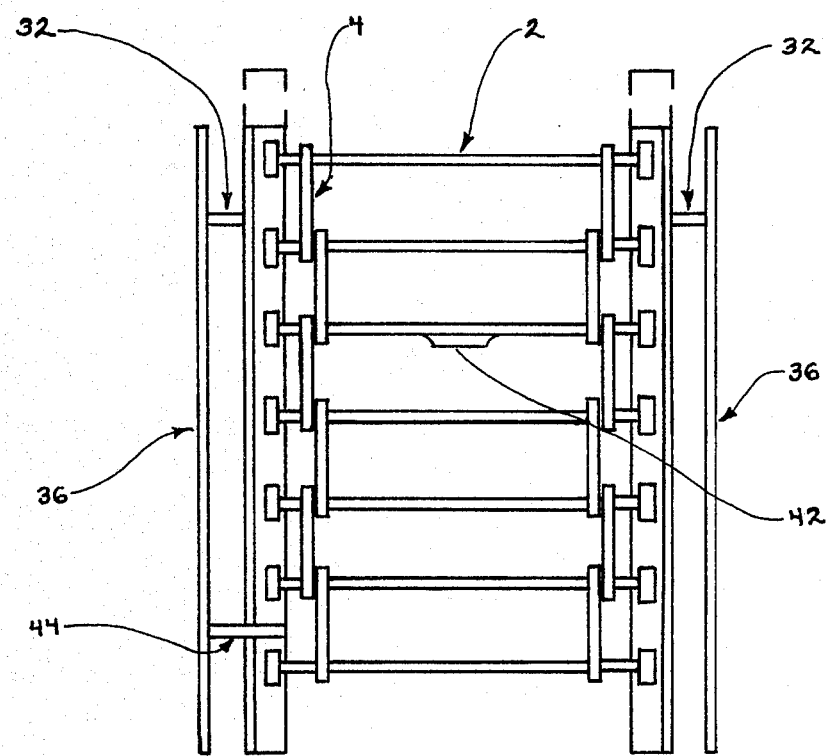
FIG. 2 is a front elevational view of the gate shown in FIG. 1, shown however in the closed position.

Turning now to the drawings, wherein like reference numbers designate like or corresponding parts, the bars 2 are flexibly linked by spacers 4, which maintain uniform spacing between the bars 2, while yet allowing the bars 2 to traverse the junction 24 between the lower gate track 6 and the upper gate track 8. That is to say, the spacers 4 link the bars 2 flexibly rather than rigidly.

In one particular embodiment of the invention the spacers 4 are simply rectangular strips having holes at each end, with the bars 2 passing through said holes. In another embodiments the spacers 4 may be attached to the bars 2 by any of various types of rotating joints well known in the art.

It will be understood however by those skilled in the art, that no particular form of spacer 4 is essential to the operation of the applicant's invention, and that many different types of spacers 4 may be flexibly connected to the bars 2 by numerous equivalent means allowing rotation of the spacers 4 with respect to the bars 2, so as to maintain uniform spacing of the bars 2 while allowing the bars 2 to freely move between the lower gate track 6 and the upper gate track 8.

The bars 2 rest with their ends 26 in the gate track 46 disposed on each side of the gate, which gate track 46 comprises a lower gate track 6 and an upper gate track 8. The lower gate track 6 and the upper gate track 8 are joined at an acute angle 28 at their junction 24. The junction 24 is a section of gate track in the form of a smooth continuous curve, joining the straight lower gate track 6 to the straight upper gate track 8. The acute angle 28 is reasonably close to 90 degrees, so that, when the gate is open as in FIG. 1 (position A), with the lower gate track 6 vertical, the upper gate track 8 and the bars 2 will not significantly intrude into the cattle storage space or other working space beneath the upper gate track 8.

The acute angle 28 is also reasonably close to 90 degrees in order that only a slight rotation of the gate track 46 about the pivot axis 10 suffices to move the upper gate track 8 from a position in which the upper gate track 8 slopes downward in the direction away from the junction 24, as in position A of FIG. 1, to a position in which the upper gate track 8 slopes downward in the direction toward the junction 24.

In one embodiment of applicant's invention the bars 2 consist simply of sections of cylindrical steel pipe, which, being hollow, can offer great strength while yet avoiding the weight of a gate having solid bars, thus facilitating easy and rapid movement of the gate. In the preferred embodiments the bars 2 are cylindrical in form, whether hollow or not, to facilitate ease of sliding and avoid binding in the motion of the bars 2 within the gate track 46.

The ends 26 of the bars 2 are in one embodiment equipped with small bearing-mounted track wheels 30, which facilitate free movement of the bars 2 in the gate track 46. In embodiments not utilizing the track wheels 30 a suitable lubricant may instead be used to lubricate the inside of the gate track 46, so as to allow free movement of the bars 2 in the gate track 46.

The gate track 46 is so mounted as to be rotatable about the pivot axis 10. In one embodiment this may be accomplished by attaching the gate track 46 by spokes 34 to an axle 32, the axle 32 being parallel to the bars 2 and being located along the pivot axis 10, the axle 32 being also perpendicular to the plane of the lower gate track 6 and the upper gate track 8 and being rotatably attached to fixed supports in any suitable manner, by bearings or equivalent means well-known in the art. Those skilled in the art will appreciate, however, that many equivalent means could be used to mount the gate track 46 so that the gate track 46 is rotatable about the pivot axis 10, and that applicant's invention is not dependent upon the particular rotation means used.

FIG. 1 illustrates the operation of one embodiment of applicant's invention, in which the gate may be quickly closed through the action of gravity, upon slight rotation of the gate track 46. In position A of FIG. 1 the gate is open. The upper gate track 8 slopes downward in the direction away from the junction 24, so that gravity urges the bars 2 in the direction (to the left in FIG. 1) away from the junction 24. Thus the bars 2 will not enter the lower gate track 6 and the gate is maintained in a stable open position. A small stop 38 located inside the outer end 40 of the upper gate track 8 prevents the bars 2 from sliding out of the end 40 of the upper gate track 8 when the gate is in the open position.

When it is desired to close the gate, the operator rotates the gate track 46 to the position B of FIG. 1. This may be done by simply pushing the lower gate track 6 to the left in FIG. 1, or by grasping and pulling down upon the gate handle 42 attached to the bars 2.

When the upper gate track 8 reaches a position as shown in FIG. 1, position B, at which the upper gate track 8 slopes downward in the direction toward the junction 24, the force of gravity urges the bars 2 toward the junction 24, so that the bars 2 slide into the lower gate track 6 and fall to close the gate. Such motion is, of course, accelerated if the operator moves the gate to position B of FIG. 1 by pulling downward upon the gate handle 42 attached to the bars 2.

Premature or undesired opening of the gate is prevented by the employment of a gate track stop 44, projecting from a fixed support 36. The weight of the upper gate track 8 and the bars 2 exerts a counter-clockwise torque upon the gate track 46, thus maintaining the lower gate track 6 fixed against the gate track stop 44. Thus the gate track 46 is maintained in position A of FIG. 1, until moved by the operator. Those skilled in the art will appreciate however that many equivalent gate track stop means could be used to maintain the gate track 46 in position A of FIG. 1, and that applicant's invention is not dependent upon the use of the particular means disclosed herein.

Figure 3:
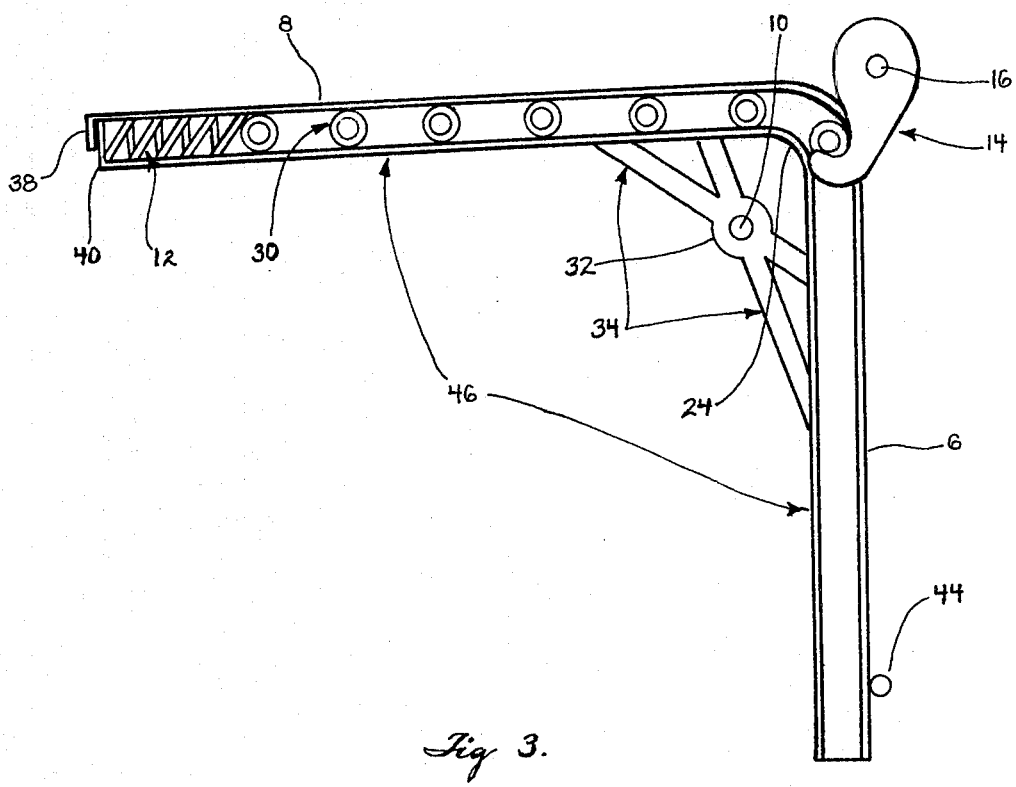
FIG. 3 is a side elevational view of a different embodiment of applicant's invention, in the open position.
Figure 4:
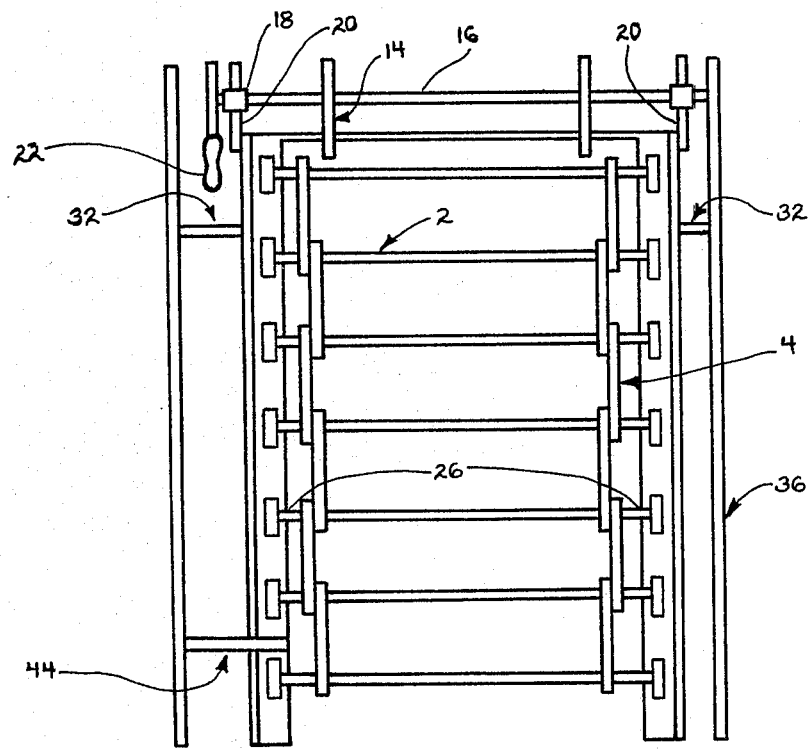
FIG. 4 is a front elevational view of the embodiment of FIG. 3, shown however in the closed position.
Figure 5:
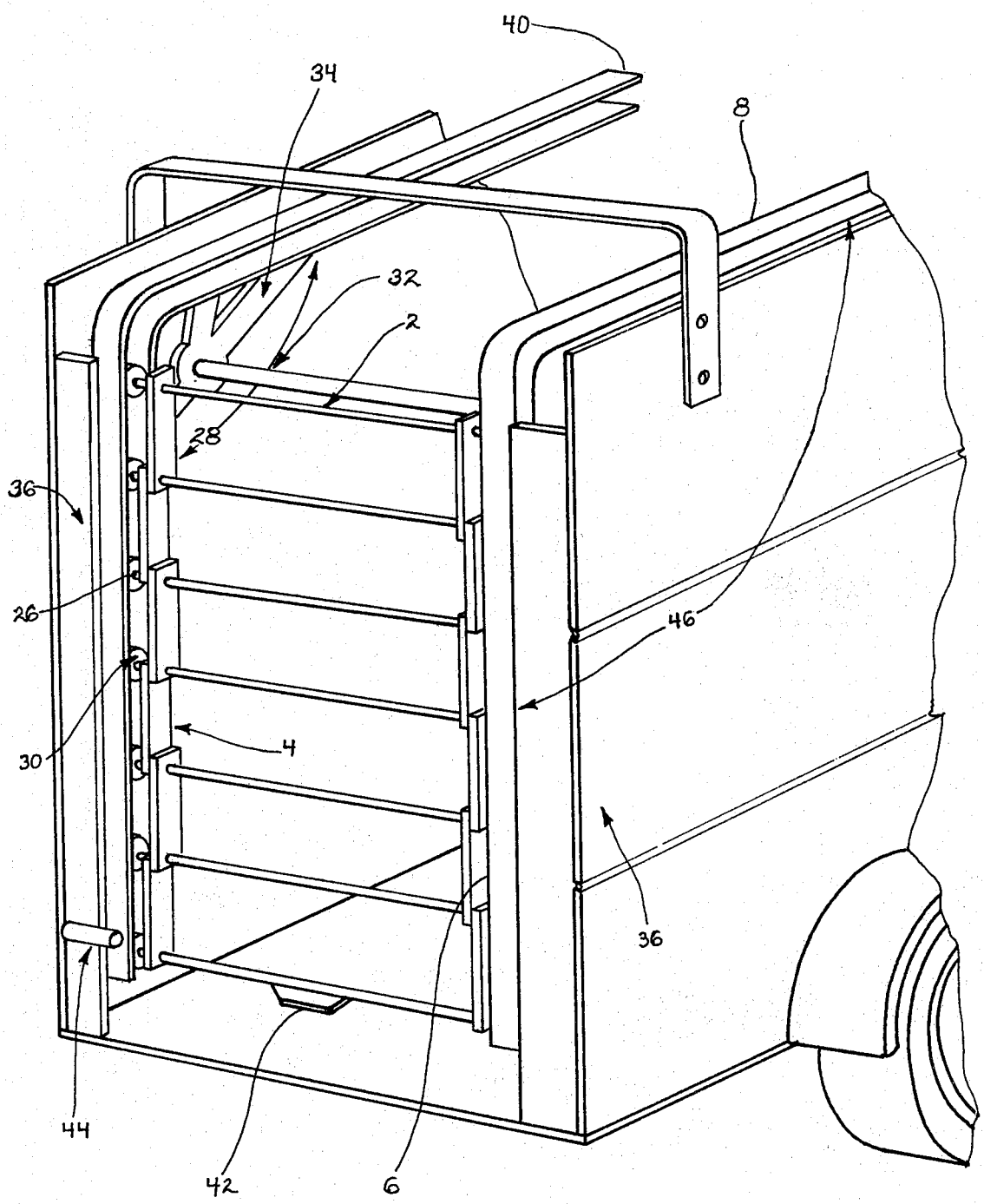
FIG. 5 is a perspective view of one embodiment of applicant's gate mounted in the rear end of a cattle hauling truck.

In another embodiment of applicant's invention illustrated in FIG. 3, the downward motion of the closing gate is further accelerated by the use of compressed springs 12 located within the upper gate track 8. When the gate is in the open position illustrated in FIG. 3, the springs 12 are compressed between the bars 2 and the stops 38. In this position the bars 2 are restrained from being driven into the lower gate track 6, by a lock 14 which engages one of the bars 2. The lock 14 is rigidly attached to a shaft 16, the shaft 16 being rotatably attached through collars 18 in bosses 20, which bosses 20 are rigidly attached to the gate track 46. A lock handle 22 is attached to one end of the shaft 16, so that the shaft 16 may be rotated to disengage the lock 14 from the bars 2. It will be understood by those skilled in the art that many equivalent means well known in the art could be used to lock the bars 2 against the compressive force exerted by the springs 12, and that applicant's invention is not dependent upon the use of the particular means herein disclosed.

When it is desired to close the gate, the lock handle 22 may be used to disengage the lock 14 from the bars 2, whereupon the compressive force exerted by the springs 12 accelerates the bars 2 in the direction of the junction 24, thereby moving the bars 2 into the lower gate track 6. The compressive force exerted by the springs 12 continues to accelerate the gate closing motion of the bars 2 until the springs 12 are fully extended.

In the preferred embodiments applicant's invention may be fabricated of steel or other metal of suitable strength, using conventional metal working techniques well known in the art. The bars 2 may be fashioned from sections of hollow steel pipe, as heretofore indicated. The gate track 46 may be fabricated by welding rectangular metal strips together, to form a single straight gate track 46, and then bending the gate track 46 at the junction 24. Alternatively the lower gate track 6 and the upper gate track 8 may be fabricated separately and joined together by welding each of these sections to a curved short section of gate track, forming the junction 24 between the lower gate track 6 and the upper gate track 8.

Portions of applicant's invention which are indicated to be rigidly attached to one another in the foregoing description, may be so attached by welding, or by the use of screws or bolts or metal bonding adhesives of suitable strength, all of which are well known in the art.

Although metal would be used in the fabrication of the preferred embodiments of applicant's invention, it will be understood from the foregoing description that applicant's invention is not dependent upon the use of any particular material, and that gates of the form described herein may be fabricated of other materials of suitable strength, including high strength plastics or wood.

Those skilled in the art will appreciate that the invention may be employed in conveyances and in configurations other than those specifically disclosed herein, and that various changes and modifications other than those indicated above can be made in the invention without departing from the spirit and scope thereof. The essential characteristics of the invention are defined in the following claims.

I claim:

1. Quick closing gate, comprising:
   (a) gate track disposed on each side of said gate, comprising:
      (1) lower gate track, disposed in an approximately vertical orientation;
      (2) upper gate track, joined to said lower gate track at a curved junction, said upper gate track and lower gate track forming an acute angle reasonably close to 90 degrees;
      (3) stop means, located at the end of said upper gate track opposite said junction, for preventing egress from said upper gate track of objects sliding within said upper gate track;
   (b) rotation means, connected to said gate track and to fixed supports, for rotating said gate track about a pivot axis perpendicular to the plane of said lower gate track and said upper gate track;
   (c) gate track stop means, engaging said gate track to a fixed support, for maintaining said lower gate track in a vertical position;
   (d) a plurality of horizontal bars slidably engaged in said gate track at the ends of said bars;
   (e) spacer means, flexibly attached to said bars, for maintaining uniform spacing between said bars while allowing said bars to freely slide between said upper gate track and said lower gate track.

2. The gate of claim 1, further comprising:
   (f) a plurality of springs in said upper gate track between said bars and said stop means;
   (g) lock means, engageable with one of said bars and connected to said gate track, for preventing motion of said bars when said springs are compressed;
   (h) lock handle means, attached to said lock means, for disengaging said lock means from said bars.

3. The gate of claim 1 or claim 2, wherein said bars are cylindrical in shape.

4. The gate of claim 1 or claim 2, wherein said bars are hollow.

5. The gate of claim 1 or claim 2, wherein said rotation means comprises:
   (1) a plurality of spokes connected to said gate track;
   (2) an axle connected to said spokes, said axle being parallel to said bars and perpendicular to the plane of said lower gate track and said upper gate track, and being rotatably attached to a plurality of fixed supports.

6. The gate of claim 1 or claim 2, further comprising track wheels rotatably attached to each end of each of said bars, said track wheels being slidably and rotatably engaged within said gate track.

7. The gate of claim 1 or claim 2, wherein said gate is metal.

8. The gate of claim 1 or claim 2, wherein said gate is plastic.

9. The gate of claim 1 or claim 2, wherein said gate is wood.

* * * * *